(12) United States Patent
Ooiwa

(10) Patent No.: US 7,784,168 B2
(45) Date of Patent: Aug. 31, 2010

(54) MAGNET PROTECTION MECHANISM FOR MAGNET BODY IN ROTOR AND MAGNET PROTECTION METHOD

(75) Inventor: Tooru Ooiwa, Toyota (JP)

(73) Assignee: Denso Corporation, Kariya (JP)

( * ) Notice: Subject to any disclaimer, the term of this patent is extended or adjusted under 35 U.S.C. 154(b) by 251 days.

(21) Appl. No.: 12/000,755

(22) Filed: Dec. 17, 2007

(65) Prior Publication Data

US 2008/0104826 A1  May 8, 2008

Related U.S. Application Data

(62) Division of application No. 11/503,967, filed on Aug. 15, 2006, now abandoned.

(30) Foreign Application Priority Data

Sep. 1, 2005  (JP) ............... 2005-253737

(51) Int. Cl.
*H02K 15/10* (2006.01)

(52) U.S. Cl. .............. 29/598; 310/263; 310/156.38; 310/261; 310/156.72; 310/156.01; 29/596; 29/607

(58) Field of Classification Search .............. 29/842, 29/598, 596, 607; 310/236, 156.38, 261, 310/156.72, 91, 42, 156.01
See application file for complete search history.

(56) References Cited

U.S. PATENT DOCUMENTS 5,177,391 A  1/1993  Kusase et al.
5,969,459 A  10/1999  Taniguchi et al.
6,104,118 A  8/2000  Kanazawa et al.
6,111,390 A  8/2000  Inaba et al.
6,160,384 A  12/2000  Inaba et al.
6,311,383 B1  11/2001  Umeda et al.
6,486,585 B1 *  11/2002  Badey et al. ............... 310/263
6,548,935 B1  4/2003  Shendi et al.
6,747,384 B2  6/2004  Militello et al.
6,853,111 B2  2/2005  Umeda et al.

(Continued)

FOREIGN PATENT DOCUMENTS

JP  A-60-234449  11/1985

(Continued)

OTHER PUBLICATIONS

English Translation of Notification of Reasons for Rejection for Japanese Patent Application No. 2005-253737, Jun. 4, 2009, p. 1-3, Japan.

*Primary Examiner*—Derris H Banks
*Assistant Examiner*—Azm Parvez
(74) *Attorney, Agent, or Firm*—Oliff & Berridge, PLC

(57) ABSTRACT

A magnet covering member made of a soft steel plate covers an outer surface of a magnetized permanent magnet placed in a rotor core of a rotor. The magnet covering member is detached from the permanent magnet when the rotor is incorporated into a stator of an alternator during an alternator assembling process. Because of a soft magnetic characteristic of the magnet covering member, an outer magnetic field generated by the permanent magnet placed between adjacent claw poles of the rotor core makes a magnetic short-circuit, and a magnetic attracting phenomenon caused by such a magnetic field is thereby reduced. The soft magnetic characteristic of the magnet covering member also serves to support the rotor.

18 Claims, 8 Drawing Sheets

U.S. PATENT DOCUMENTS

| | | |
|---|---|---|
| 6,853,112 B2 | 2/2005 | Nakamura et al. |
| 6,897,597 B1 | 5/2005 | Armiroli et al. |
| 6,924,580 B2 | 8/2005 | Tajima et al. |
| 7,057,327 B2 * | 6/2006 | Kanazawa et al. .......... 310/263 |
| 2002/0117934 A1 | 8/2002 | Kanazawa et al. |
| 2002/0117935 A1 | 8/2002 | Kanazawa et al. |
| 2004/0032183 A1 | 2/2004 | Nakamura et al. |
| 2005/0110358 A1 | 5/2005 | Maeda et al. |

FOREIGN PATENT DOCUMENTS

| | | |
|---|---|---|
| JP | A-10-004660 | 1/1998 |
| JP | A-10-004662 | 1/1998 |
| JP | A-10-004663 | 1/1998 |
| JP | A-10-004664 | 1/1998 |
| JP | A-10-201149 | 7/1998 |
| JP | A-11-127561 | 5/1999 |
| JP | A-11-191951 | 7/1999 |
| JP | A-11-215900 | 8/1999 |
| JP | A-11-341762 | 12/1999 |
| JP | A-2000-134888 | 5/2000 |
| JP | A-2001-218402 | 8/2001 |
| JP | A-2002-218713 | 8/2002 |
| JP | A-2002-262530 | 9/2002 |
| JP | A-2003-513597 | 4/2003 |
| JP | A-2003-339141 | 11/2003 |
| JP | A-2004-007958 | 1/2004 |
| JP | A-2005-160172 | 6/2005 |

* cited by examiner

FIG. 9

PROCESS GROUP A (ASSEMBLING ROTOR)

① ASSEMBLING POLE CORES AND FIELD COIL
② ASSEMBLING PERMANENT MAGNETS
[ATTACHING MAGNET COVERING MEMBER]
③ WELDING COOLING FANS
④ IMPREGNATING FIELD COIL FOR HEAT-RESISTANCE, ELECTRIC INSULATION, etc.
⑤ CUTTING AND GRIDING POLE CORES AND OTHERS*)
⑥ REMOVING CHIPS
⑦ ADJUSTING ROTATION BALANCE*)
⑧ INSPECTING DIMENSION AND CHARACTERISTIC OF ROTOR
⑨ STORING ASSEMBLED ROTOR

*)MAGNET COVERING MEMBER 190 (AS SECOND EMBODIMENT), 190A AND 190B (AS PREFERRED MODIFICATION) IS DETACHED DURING EACH OF ⑤ AND ⑦, AND THEN ATTACHED AGAIN AFTER COMPLETION OF EACH OF ⑤ AND ⑦.

PROCESS B
[CONVEYING ASSEMBLED ROTOR 1]

FINAL ASSEMBLING PROCESS GROUP FOR ALTERNATOR

[DETACHING MAGNET COVERING MEMBER]
⑫ ASSEMBLING D-FRAME
⑬ ASSEMBLING ROTOR INTO ALTERNATOR
....
....
⑲ INSPECTING DIMENSION AND CHARACTERISTIC OF ASSEMBLED ALTERNATOR

PROCESS C
[TRANSPORTATION OF ASSEMBLED ROTOR]
[⑪ STORING AND SUPPLYING ASSEMBLED ROTOR]

FIG. 10

PROCESS GROUP A (ASSEMBLING ROTOR)

① ASSEMBLING POLE CORES AND FIELD COIL
② ASSEMBLING PERMANENT MAGNETS (NON-MAGNETIZED)
  ATTACHING MAGNET COVERING MEMBER
③ WELDING COOLING FANS
④ IMPREGNATING FIELD COIL FOR HEAT-RESISTANCE, ELECTRIC INSULATION, etc.
⑤ CUTTING AND GRIDING POLE CORES AND OTHERS*)
⑥ REMOVING CHIPS
⑦ ADJUSTING ROTATION BALANCE*)
⑧ INSPECTING DIMENSION AND CHARACTERISTIC
⑨ CONVEYING ASSEMBLED ROTOR
⑩ MAGNETIZING PERMANENT MAGNETS

*)MAGNET COVERING MEMBER 190 (AS SECOND EMBODIMENT), 190A AND 190B (AS PREFERRED MODIFICATION) IS DETACHED DURING EACH OF ⑤ AND ⑦, AND THEN ATTACHED AGAIN AFTER COMPLETION OF EACH OF ⑤ AND ⑦.

PROCESS B

CONVEYING ASSEMBLED ROTOR 1

FINAL ASSEMBLING PROCESS GROUP FOR ALTERNATOR

DETACHING MAGNET COVERING MEMBER
⑫ ASSEMBLING D-FRAME
⑬ ASSEMBLING ROTOR INTO ALTERNATOR
....
....
⑲ INSPECTING DIMENSION AND CHARACTERISTIC OF ASSEMBLED ALTERNATOR

PROCESS C

TRANSPORTATION OF ASSEMBLED ROTOR

⑪ STORING AND SUPPLYING ASSEMBLED ROTOR

US 7,784,168 B2

MAGNET PROTECTION MECHANISM FOR MAGNET BODY IN ROTOR AND MAGNET PROTECTION METHOD

This is a Divisional of U.S. patent application Ser. No. 11/503,967 filed on Aug. 15, 2006, which is hereby incorporated herein by reference in its entirety. This application claims priority to Japanese Patent Application No. 2005-253737 filed on Sep. 1, 2005, which is hereby incorporated herein by reference in its entirety.

BACKGROUND OF THE INVENTION

1. Field of the Invention

The present invention generally relates to a magnet protection mechanism and a magnet protection method capable of protecting magnet bodies such as permanent magnets, from magnetic powders and dust, placed in a rotor of an inner-rotor type vehicle alternator.

2. Description of the Related Art

There is a conventional technique to increase the magnitude of or to support a magnetic flux of a field current at each claw pole by a magnetic flux of a permanent magnet additionally placed between adjacent claw poles in a Lundell type rotor core of a rotary electric machine such as a vehicle alternator to be driven by an internal combustion engine of a vehicle.

Various prior patent documents, in particularly, following Japanese patent laid open publication documents (1) to (7) have disclosed such a conventional technique:

(1) JP 2004-7958; (2) JP 2002-262530; (3) JP H10-4664;
(4) JP H10-201149; (5) JP H10-4660; (6) JP H10-4662; and
(7) JP H10-4663.

Although the vehicle alternator of the Lundell type rotor core having such a configuration increases its output power by increasing the magnitude of magnetic flux generated by additionally incorporating permanent magnets into the rotor core when compared with a vehicle alternator of a same volume without incorporating any additional permanent magnets, such a configuration deteriorates a magnetic characteristic of and decreases the durability of the magnet components such as the claw poles and the permanent magnets because of the adhesion of magnet powders generated during manufacturing processes of the rotor core onto the surface of the magnet component, in particular, of the permanent magnet.

SUMMARY OF THE INVENTION

It is an object of the present invention to provide a magnet protection mechanism and a magnet protection method capable of protecting adhesion of magnetic powders onto magnet bodies such as permanent magnets placed in a rotor with a simple manner before incorporating a stator into a rotary electric machine.

To achieve the above object, the present invention provides a magnet protection mechanism, configured to protect magnet bodies such as permanent magnets mounted on a rotor. The magnet covering member covers at least an outer exposed surface of a magnet body at an outer peripheral side thereof. The magnet body includes a magnetized magnet body. The magnet covering member is detachably supported by a rotor with the magnet bodies.

Because of preventing the adhesion of dusts such as magnetic powders onto the magnet bodies of the rotor with a simple configuration and simple working, it is possible to prevent scattering or flying the magnet powders by centrifugal force of rotation of the rotor and to prevent the adhesion of the scattered magnet powders onto the outer peripheral surface of the rotor.

Such a magnetized magnet body has a magnet protection cover attached onto the outer surface thereof. The magnet protection cover is made of resin or non magnetic steel sheet. The rotor is a well known Lundell type rotor core and another type rotor with magnets. In particular, the magnet covering member of the magnet protection mechanism according to the present invention is detached from the magnet body placed in the rotor core before a process of incorporating the rotor into the stator of the alternator.

In various experiences of the inventor according to the present invention, during the manufacturing process of the rotor in which the magnet bodies such as permanent magnets are incorporated and placed into the rotor core, magnet powders are adhered onto the surface of each magnet body, in particular, on the outer peripheral surface of the magnet body. Such magnet powders exist in a manufacturing factory or are generated during cutting and grinding process for the rotor core because of the presence of a strong magnetic field near the outer surface of the magnetized magnet body. It is difficult to detect the presence of and to eliminate the magnetic powders adhered on the outer surface of the magnetized magnet body.

According to the present invention, the magnet covering member covers the outer exposed surface of the magnetized magnet body incorporated in the rotor core during a necessary processing period before incorporating the rotor into the stator core. The magnet covering member of the present invention of a soft magnet characteristic is made of a soft steel plate in easy processing with a cheap cost. After incorporated into the permanent magnets in the rotor, the magnet covering member makes a magnetic short circuit of a leakage magnet field generated by the magnetized magnet bodies. It is thereby possible to drastically reduce the magnetic field leaked into the outer space of the magnetized magnet bodies and the rotor core to which the magnetized magnet bodies are fixed. As a result, it is possible to prevent the adhesion of the magnetic powders onto the rotor efficiently. Further, the magnet covering member protects the magnetized magnet body from mechanical impact because the magnet covering member covers the magnetized magnet body. That is, because the magnet covering member made of a soft magnetic sheet fundamentally acts as a magnet field short-circuit member making a short circuit of the magnetic field generated between both magnetic poles of the magnetized magnet body, the magnet covering member efficiently prevents any formation of a magnet pole on the surface of the magnetized magnet body and the rotor core.

According to another aspect of the present invention, the magnet body is arranged and placed in a gap between adjacent claw poles of a Lundell type rotor core in the rotor and is positioned radially inward of the rotor core rather than an outer peripheral surface of the claw pole. The magnet covering member is placed radially inward than the outer peripheral surface of the claw pole of the Lundell type rotor core. By this configuration, because the magnetic covering member positioned radially inward rather than the outer surface of the rotor core, namely, rather than the outer surface of the claw pole of the Lundell type rotor core, it is possible to grind and cut the surface of the outer surface of the rotor core in order to adjust the rotation balance of the rotor core while the magnet covering member is placed in the rotor core. This can prevent any adhesion of magnetic powders generated during the grinding and cutting processes onto the rotor core and the magnetized magnet bodies incorporated in the rotor core. Even if the magnet powders are attached onto the surface of the magnet bodies and the rotor core, it is possible to easily remove the magnet powders from the surface of the magnet bodies and the rotor core by using compressed air because of a weak adhesion force in the magnet bodies.

According to another aspect of the present invention, a sectional shape of the magnet covering member is an approximate "U" shape. The magnet covering member is placed in the gap between the adjacent claw poles and has an inner surface part and a pair of side parts. The inner surface part covers the outer exposed surface of the magnet body, at the outer peripheral side thereof. A pair of the side parts is extended from both ends of an axis direction of the outer surface of the magnet covering member toward the inside of the radial direction, covering the side surfaces of the magnet body.

It is possible to prevent the adhesion of the magnetic powders onto the side surfaces of the magnetic body and to make a magnetic short-circuit between the adjacent claw poles of the Lundell type rotor core efficiently, and further to prevent the adhesion of the magnetic powders efficiently.

According to another aspect of the present invention, a front part of each side part of the magnet covering member has a sealing projection part that is bent toward the magnet body side and detachable in the radial direction from the magnet body. It is thereby possible to easily detach the magnet covering member from the magnet body by its elastic deformation function because the magnet covering member is made of a soft magnet sheet.

According to another aspect of the present invention, the magnet covering member is attached onto the magnet body at a predetermined distance determined by a gap, between the adjacent claw poles, against the outer exposed surface of the magnet body at the outer peripheral side. It is thereby possible to eliminate occurrence of magnetic strong-adhesion onto the magnet body, and thereby possible to avoid the difficulty of detaching the magnet covering member of a soft magnetic characteristic from the magnetic body. Still further, it is possible to protect mechanical damage to the surface of the magnet body by the magnet covering member when the magnet body is covered with a resin material.

According to another aspect of the present invention, the magnet covering member has a cylindrical shape and attached to the outer peripheral surface of a Lundell type rotor core of the rotor in which each magnet body is placed at a gap between adjacent claw poles of the Lundell type rotor core. It is thereby possible to easily detach the magnet covering member from the magnet body and possible to increase the mechanical protection of the rotor core against mechanical damage although it is impossible to process the outer surface of each claw pole of the Lundell type rotor core unless the magnet covering member of a cylindrical shape is detached.

According to another aspect of the present invention, a magnet protection method is capable of protecting magnet bodies, that are magnetized in advance, placed and fixed to a rotor core in a rotor in which an outer surface of each magnet body being placed radially inward than an outer peripheral surface of the rotor core. The magnet protection method has an attaching process and a detaching process. In the attaching process, a magnet covering member is attached onto the magnet body before cutting and grinding processes of the outer peripheral surface of the rotor core so that the magnet covering member covers at least the outer surface of the magnet body radially outward than the outer surface of the magnet body, and radially inward of the outer surface of the rotor core. The detaching process detaches the magnet covering member from the magnet body after completion of the cutting and grinding process and before a process of incorporating the rotor into a stator of an alternator.

In the magnet protection method, while the outer surface of the rotor core is processed, the magnetic covering member covers the magnet body, where the magnet covering member is placed radially inward rather than the position of the outer surface of the rotor core, and the magnet body is placed radially inward rather than the position of the magnet covering member. It is acceptable to form the magnet covering member with a soft magnetic material capable of preventing the leakage of the magnet field outside by a magnetic short-circuit making function and a magnet field shielding function described above, it is further acceptable to form it with a resin material such as a adhesion tape.

Because the magnet covering member is placed at radially inward rather than the outer surface of the rotor core, as described above, it is possible to grind and cut the outer surface of the rotor core in order to adjust the rotation balance of the rotor core in which magnetic powders are generated and flying, and it is possible to easily detach the magnetic covering member from the magnet body placed in the rotor core after the grinding and cutting processes.

BRIEF DESCRIPTION OF THE DRAWINGS

A preferred, non-limiting embodiment of the present invention will be described by way of example with reference to the accompanying drawings, in which:

FIG. 9 shows rotor and vehicle alternator manufacturing processes using permanent magnets that have been magnetized in advance; and FIG. 10 shows rotor and vehicle alternator manufacturing processes using permanent magnets that have not been magnetized in advance.

DETAILED DESCRIPTION OF THE PREFERRED EMBODIMENTS

Figure 1:
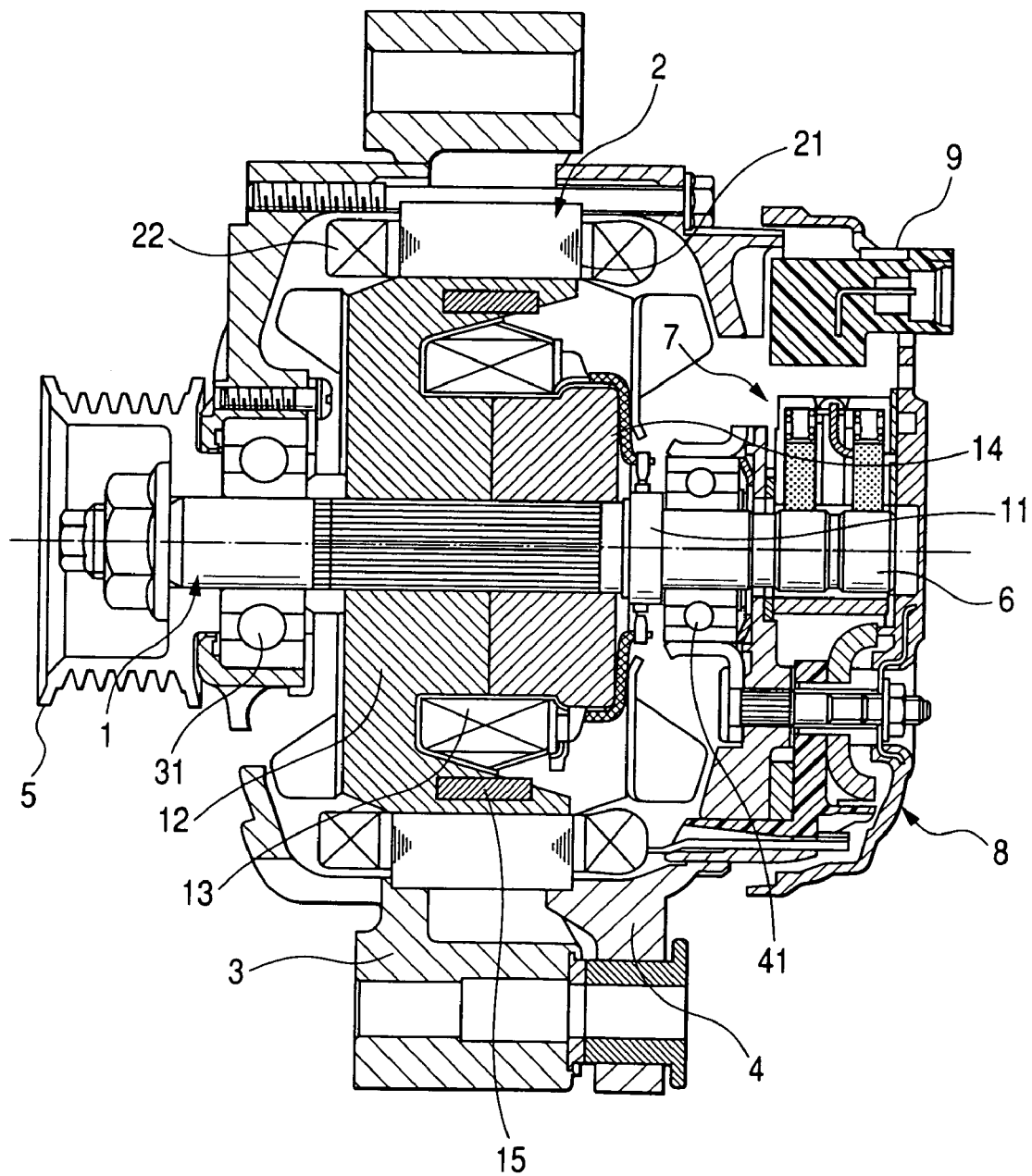
FIG. 1 is a sectional diagram of a vehicle alternator, in an axis direction, to be mounted on a vehicle according to first and second embodiments of the present invention.

Hereinafter, various embodiments of the present invention will be described with reference to the accompanying drawings. In the following description of the various embodiments, like reference characters or numerals designate like or equivalent component parts throughout the several diagrams.

(Basic Structure of a Vehicle Alternator)

Firstly, a description will be given of the basic structure of a vehicle alternator equipped with a rotor according to preferred embodiments with reference to FIG. 1.

FIG. 1 is a sectional diagram of the vehicle alternator, in an axis direction, to be mounted on a vehicle. As shown in FIG. 1, the vehicle alternator has a rotor, a stator 2, a front frame 3, a rear frame 4, a pulley 5, a slip ring 6, a brush mechanism 7, a rectifier 8, and a regulator 9.

The stator 2 has a stator coil 22 wound on a stator core 21 and fixed to the inner circumference surfaces of the front frame 3 and the rear frame 4. The front frame 3 and the rear frame 4 accommodate the stator 2 and are fastened to each other by bolts. Further, the front frame 3 and the rear frame 4 support rotatably a rotary shaft 11 of the rotor 1 through both bearings 31 and 41.

The rotor 1 consists of a front side pole core 12 fixed to the rotary shaft 11, a field coil 13 (hereinafter, also referred to as "exciting coil"), a rear side pole core 14, and a permanent magnet portion. Each of the front side pole core 12 and the rear side pole cores 14 consists of same number plural claw poles. The permanent magnet portion consists of plural permanent magnets 15, which have been magnetized in advance, are placed between the claw poles.

The basic construction of the rotor 1 shown in FIG. 1 will be explained in detail referring to FIG. 2 and FIG. 3.

Figure 2:
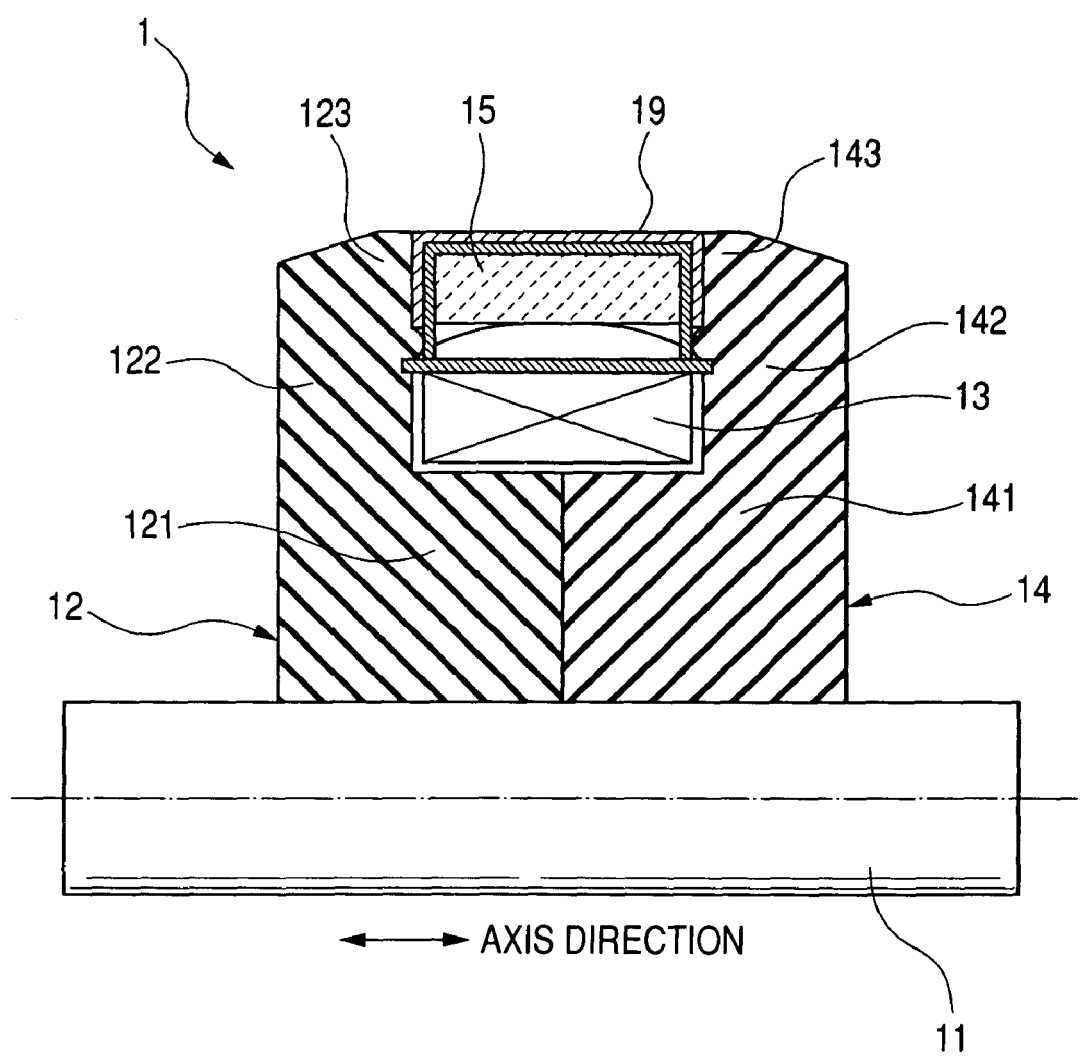
FIG. 2 is a sectional diagram of a rotor in an axis direction according to the first embodiment of the present invention.

FIG. 2 is a sectional diagram of the rotor 1, to be mounted on the vehicle alternator, in the axis direction. FIG. 3 is an enlarged partial sectional diagram of the permanent magnet 15 and a magnet covering member which covers the permanent magnet 15 in a radial direction of the rotor 1 shown in FIG. 2.

It is noted that a magnet covering member 19 as the magnet protecting mechanism has been detached or taken away from the rotor 1 in the vehicle alternator after the completion of assembling process of the vehicle alternator shown in FIG. 1. The magnet covering member 19 as the magnet protecting mechanism shown in FIG. 2 and FIG. 3 is one of the features of the present invention.

As shown in FIG. 2, the pole core 12 consists of a boss portion 121, a disk portion 122, and a pole core portion. The boss portion 121 is engaged and fastened to the rotary shaft 11. The disk portion 122 is extended outside the boss portion 121, in the radial direction of the rotor, from the front end of the boss portion 121. The pole core portion consists of plural claw poles 123. The pole core is made of forging soft steel. Similarly, the pole core 14 consists of a boss portion 141, a disk portion 142, and a pole core portion. The boss portion 141 is engaged and fastened to the rotary shaft 11. The disk portion 142 is extended outside the boss portion 141, in the radial direction of the rotor, from the front end of the boss portion 141. The pole core portion consists of plural claw poles 143. The pole cores 12 and 14 have a same shape and are made of forging soft steel.

The rear end surface of the boss portion 121 of the pole core 12 is faced to the front end surface of the boss portion 141 of the pole core 14 to each other. Thereby, the boss portions 12 and 14 accommodate the field coil 13 therein. The disk portion 122 of the pole core 12 has eight claw poles 123 as eight magnet poles. Similarly, the disk portion 142 of the pole core 14 has eight claw poles 143 as eight magnet poles. More specifically, the eight projection poles as the claw poles 123 are placed radially around at the peripheral portion of the disk portion 122 of the pole core 12. The claw poles 143 of the pole core 14 have the same configuration of the claw poles 123 of the pole core 12. The claw poles 123 in the pole core 12 and the claw poles 143 in the pole core 14 are arranged alternately in the circumference direction of the rotor core.

The outer circumference surface of each of the claw poles 123 and 143 of the pole cores 12 and 14 is faced to an inner surface of the stator core 21 while keeping a small electromagnetic gap. The permanent magnet 15 is covered with a magnet cover 151 of non-magnetize material as a covering member. Each permanent magnet 15 forming the permanent magnet portion is magnetized in the circumference direction (more precisely, in the direction of an approximate tangent line) of the pole cores 12 and 14 and placed between and fastened by the adjacent pole cores 123 and 143. Those permanent magnets correspond to magnet bodies as defined in claims. Each permanent magnet 15 in the permanent magnet portion magnetizes the adjacent claw poles 123 and 143 in opposite magnetic pole.

Because the mechanism of the vehicle alternator and the Rundell type rotor core with the permanent magnets is well known widely, the detailed explanation of the mechanism is omitted here.

First Embodiment

A description will now be given of the magnet protection mechanism and a magnet protection method before the rotor 1 such as a Lundell type rotor core is incorporated into a vehicle alternator with reference to FIG. 2, FIG. 3, and FIG. 4.

Figure 3:
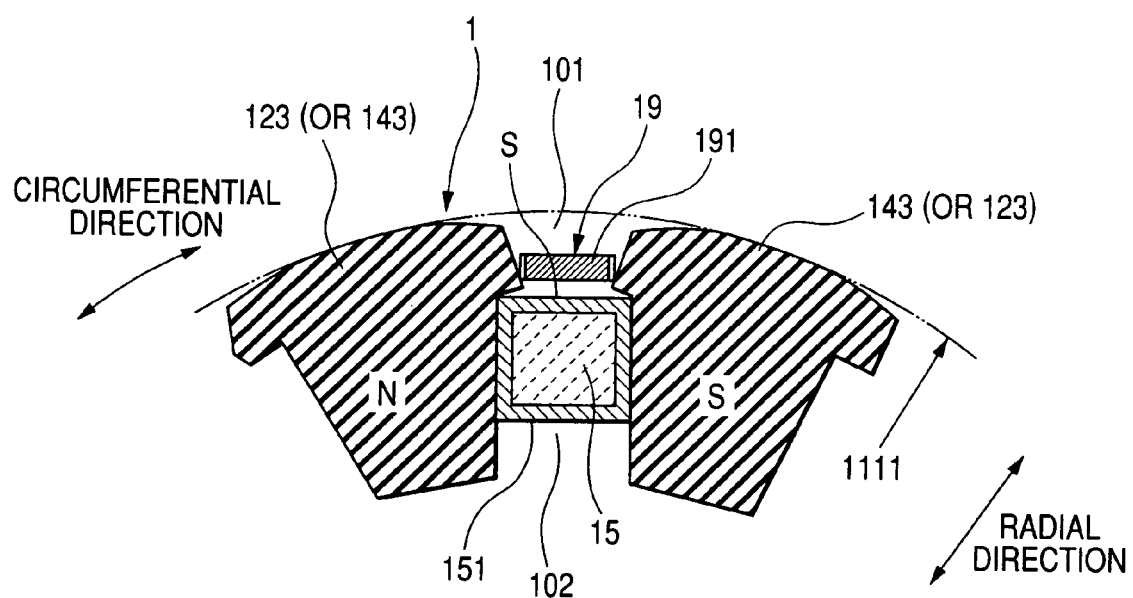
FIG. 3 is an enlarged partial sectional diagram of a permanent magnet as a magnet body and a magnet covering member that covers the permanent magnet in a radial direction of the rotor shown in FIG. 2 according to the first embodiment.
Figure 4:
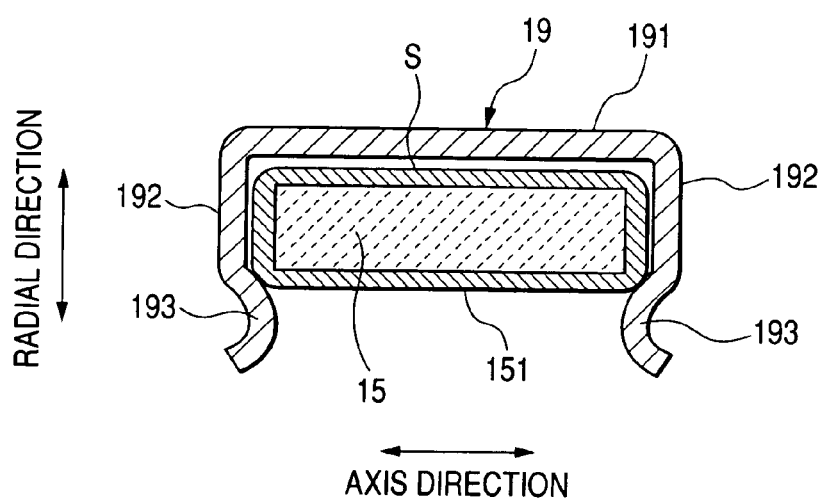
FIG. 4 is an enlarged partial sectional diagram in the axis direction showing the permanent magnet and the magnet covering member shown in FIG. 3 according to the first embodiment.

FIG. 4 is an enlarged partial sectional diagram in the axis direction showing the permanent magnet 15 (as a magnetic body) and the magnet covering member 19 shown in FIG. 3 according to the first embodiment;

Before incorporating the pole cores 12 and 14 of the rotor 1 into the stator core 21 of a vehicle alternator, the pole cores 12 and 14 shown in FIG. 3 are magnetized by using the permanent magnets 15 of the permanent magnet portion that have been magnetized in advance. Because it is difficult to form a closed magnetic path in the pole cores 12 and 14 and the stator core 21 in the vehicle alternator before such an incorporating process, a magnet field is generated widely in the peripheral space of the pole cores 12 and 14 and the permanent magnets 15. Hereinafter, such a magnet field will be referred to as "the leakage magnet field".

As shown in FIG. 3, the leakage magnet field is concentrated in both gaps 101 and 102 formed between the adjacent claw poles 124 (or 143) and 143 (or 123). The distance between the adjacent claw poles 123 and 143 that are magnetized in opposite directions becomes a minimum value. This is the reason why such a magnetic field is concentrated in the gads 101 and 102. This causes a drawback in which if magnet powders presence, namely, are flying in the outside space of the rotor 1, the magnet powders are attracted in the magnetic field in the gap 101 formed between the adjacent claw poles 123 and 143. The gap 101 between the adjacent claw poles 123 and 143 is near the outer peripheral surface of the permanent magnets 15 in the permanent magnet portion. On the other hand, the gap 102 is a gap near the inner peripheral surface of the permanent magnet 15. Accordingly, because the gap 102 in open toward the inside of the rotor 1, the magnet powders are almost not present in the gap 102. In other words, before the assembling process of the rotor 1 having the magnetized permanent magnets 15 that form the permanent magnet portion into the inside of the stator core 21, there is a possibility to happen the serious problem in which magnetic powders are flying and attracted into the gap 101 and adhered on the surface of each of the permanent magnets because the maximum strong leakage magnetic field is generated in the gap 101 near the outer peripheral surface of the permanent magnet 15. Such magnetic powders are generated, as will be described later, when the outer peripheral surface of each of the pole cores 12 and 14 is ground. In order to eliminate such a drawback, each permanent magnet 15 of the permanent magnet portion is covered with the magnet covering member 19 according to the first embodiment of the present invention. The magnet covering member 19 is made of a soft steel sheet of an approximate rectangle shape that has been bent.

As shown in FIG. 3 and FIG. 4, the magnet covering member 19 of an approximate "U" shape has an outer circumference surface part 191 and a pair of side parts 192. The magnet covering member 19 covers an exposed surface S at the outer peripheral side of each permanent magnet 15. A pair of the side parts 192 extended radially inward from both the ends of the outer peripheral surface 191 covers the side parts of each permanent magnet 15.

As shown in FIG. 2 and FIG. 3, the magnet covering member 19 is placed between the outer peripheral surface of the permanent magnet 15 and the outer peripheral surface of the claw pole 123 or 143.

The front end of each of a pair of the side part 192 in the magnet covering member 19 is bent toward the permanent magnet 15 and has sealing projection parts 193 for sealing corner parts of the permanent magnet 15 detachable in the radial direction. That is, a pair of the side parts 192 of a plate shape is deformed elastically at both ends of the outer peripheral part 191 has the sealing projection parts 193 forcedly attach the permanent magnet 15. This configuration shown in FIG. 3 can prevent detaching the magnet covering member 19 toward outside in the radial direction. Because having a soft magnetic characteristic, the magnet covering member 19 is attracted to the claw poles 123 and 143 and the permanent magnet 15 by the magnet field of the permanent magnet 15. It is thereby possible to prevent detaching the magnet covering member 19 without the sealing projection parts 193.

Further, the width of the outer peripheral surface 191 of the magnet covering member 19 in the circumference direction (or in the tangent line) is equal to the narrow width of the gap 101 between the adjacent claw poles 123 (or 143) and 143 (or 123) in the circumference direction at the outside position in the diameter direction rather than the width of the outer surface of the permanent magnet 15, as shown in FIG. 3. Thus, the magnet covering member 19 covers the permanent magnet along the space in the gap 101. As clearly shown in FIG. 3, because the gap 101 between the adjacent claw poles 123 (or 143) and 143 (or 123) is gradually narrow from the outer peripheral surface of the rotor core 1 toward the inside of the rotor core 1, the magnet covering member 19 prevent any adhesion of the magnet powders onto the outer surface of the permanent magnet 15. It is thereby possible to prevent entering magnet powders onto the outer peripheral surface of each permanent magnet 15 through the gap between the magnet covering member 19 and the claw poles 123 and 143.

According to the first embodiment of the present invention, the magnet covering member 19, placed in the gap 101 makes a magnetic short circuit between the adjacent claw poles 123 and 143 and thereby eliminates the externally leakage magnetic field, and further mechanically protects the surface of the permanent magnet 15 exposed to the outside of the rotor 1. Further, the magnet covering member 19 can prevent that magnetic powders which are attracted to and enter into the gap 101 between the adjacent claw poles where the leakage magnetic field is mostly concentrated, namely, prevent that the magnetic powders reach onto the exposed outer peripheral surface of the permanent magnets 15.

Second Embodiment

A description will now be given of the magnet protection mechanism according to the second embodiment of the present invention with reference to FIG. 5 to FIG. 8.

Similar to the first embodiment, the pole cores 12 and 14 of the rotor 1 shown in FIG. 3 are magnetized by the permanent magnets 15 that have been magnetized in advance before the incorporating process of the pole cores 12 and 14 of the rotor 1 into the stator core 21. At this manufacturing process, like the first embodiment, because it is impossible to form a closed magnet path in the pole cores 12 and 14 and the stator core 21 in the vehicle alternator, a leakage magnet field is generated widely in the peripheral space of the pole cores 12 and 14 and the permanent magnets 15. Such a leakage magnet field is concentrated in both gaps 101 and 102 between the adjacent claw poles 124 (or 143) and 143 (or 123). The distance between the adjacent claw poles 123 and 143 that are magnetized in an opposite direction becomes the minimum value. This is the reason why such a leakage magnetic field is concentrated in the gaps 101 and 102. Such a leakage magnetic field causes a drawback to attract magnet powders in the magnetic field in the gap 101 formed between the adjacent claw poles 123 and 143 if the magnet powders presence and are flying in the outside space of the rotor 1. Such magnet powders are typically generated while grinding the outer peripheral surfaces of the pole cores 12 and 14.

In order to solve such a drawback, the rotor 1 has a magnet covering member 190 of an approximate cylindrical shape according to the second embodiment of the present invention. The magnet covering member 190 made of a soft magnet sheet shown in FIG. 6A is mounted on the rotor 1 shown in FIG. 5. The magnet covering member 190 covers the outer peripheral surface of the claw poles 123 and 143 in the pole cores 12 and 14 in the rotor 1 shown in FIG. 5.

Figure 5:
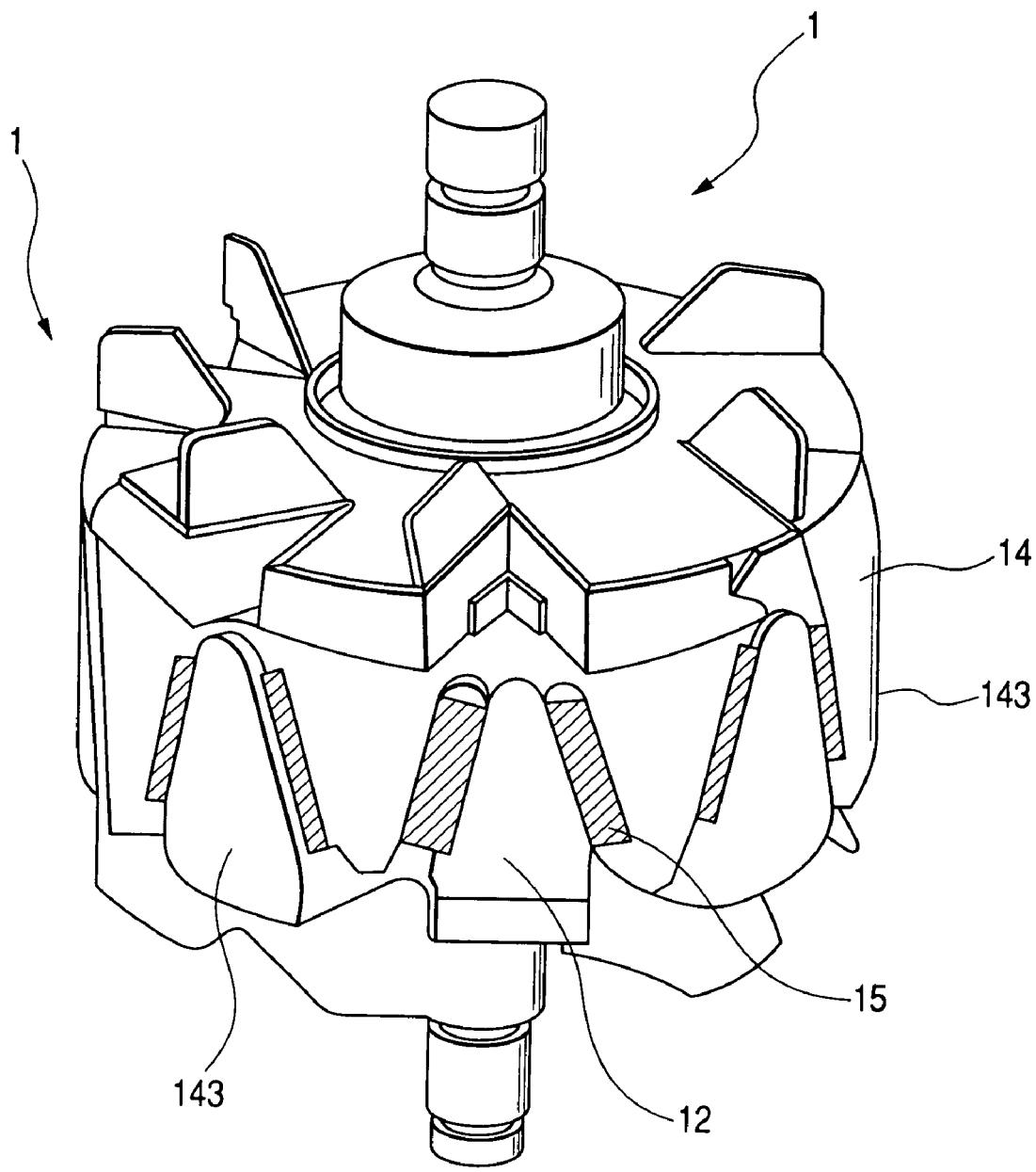
FIG. 5 is a perspective diagram showing the rotor on which the magnet covering member according to the first and second embodiments of the present invention.
Figure 6A:
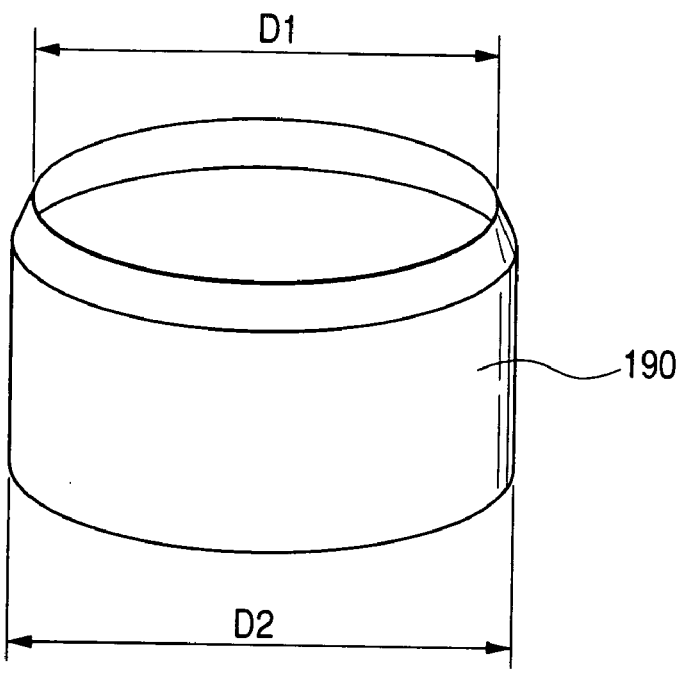
FIG. 6A is a perspective diagram showing the magnet covering member to be incorporated in the rotor shown in FIG. 5.

FIG. 5 is a perspective diagram showing the rotor 1. FIG. 6A is a perspective diagram showing the magnet covering member 190 to be mounted on the rotor 1 shown in FIG. 5.

It is noted that the magnet covering member 190 shown in FIG. 6A is detached when the assembled rotor 1 is incorporated into the stator core 21. That is, the inner diameter of the magnet covering member 190 of the second embodiment is slightly larger than the outer diameter of the rotor 1, and it is thereby possible to easily detach the magnet covering member 190 from the rotor 1 when the assembled rotor 1 is incorporated in the stator 21, where the assembled rotor 1 means that the pole cores 12 and 14, the permanent magnets 15, and the rotary shaft 11 have been assembled in one body. Such a configuration of the magnet covering member 190 can enhance the working efficiency of the vehicle alternator.

The magnet covering member 190 of an approximate cylindrical shape is stably supported by the rotor 1 because it is magnetically attracted by the magnetic pole induced on the outer peripheral surface of the claw poles 123 and 143 of the pole cores 12 and 14 by the permanent magnets 15.

Figure 7:
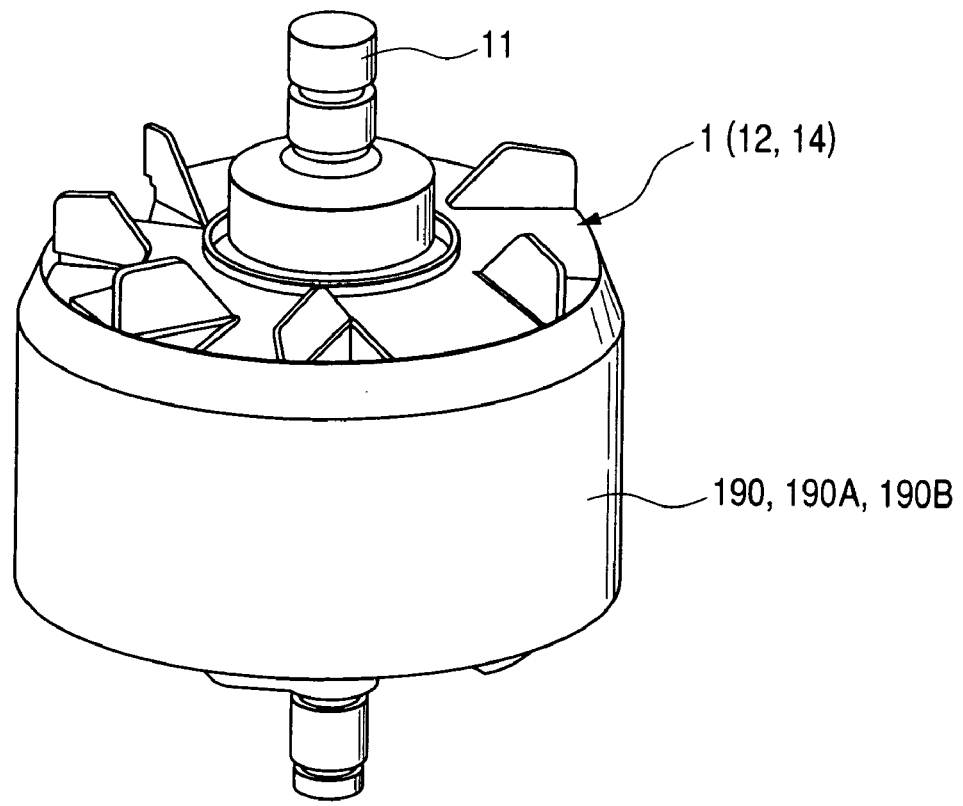
FIG. 7 is a perspective diagram showing the rotor on which the magnet covering member shown in FIG. 6A or 6B is mounted.
Figure 8:
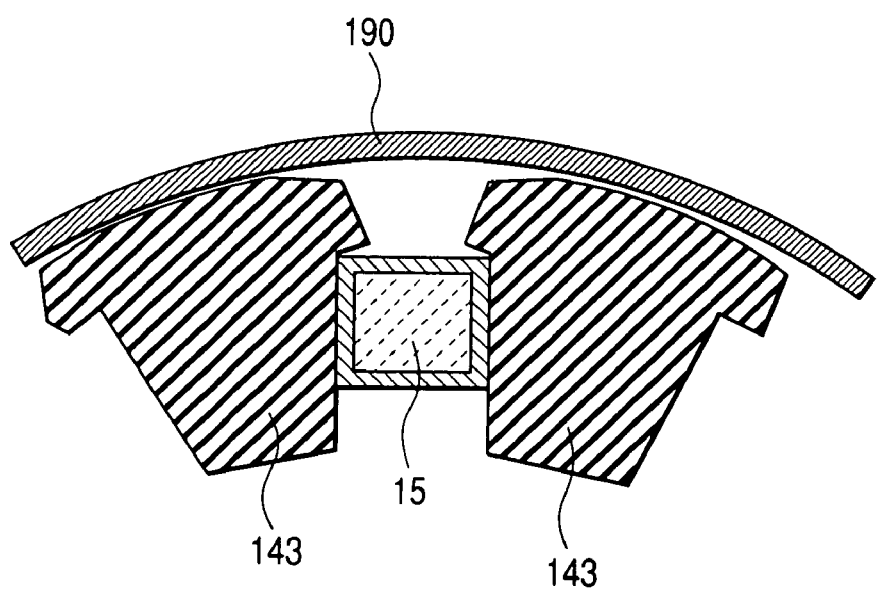
FIG. 8 is an enlarged sectional diagram in the radial direction of the magnet covering member for the permanent magnet shown in FIG. 6.

FIG. 7 is a perspective diagram showing the rotor 1 on which the magnet covering member 190 shown in FIG. 6A is stably mounted. FIG. 8 is an enlarged sectional diagram, in the radial direction, of the magnet covering member for the permanent magnet shown in FIG. 6A.

Because the magnet covering member 190 of the second embodiment makes a magnetic short circuit between the adjacent claw poles 123 and 143 and prevents the attraction of external magnet powders to the stator 1 side. Further, because the magnet covering member 190 covers the permanent magnets 15, which are weak against a mechanical impact, mounted on the pole cores 12 and 14, it is also possible to prevent any damage to the permanent magnets 15 in case of accident, for example, if the rotor 1 drops during an assembling/working process, a transfer process, and a transmission process.

As shown in FIG. 6A, the diameter "D1" of the front part of the magnet covering member 190 of the second embodiment is smaller than the diameter "D2" of the other part thereof (D1<D2). This shape of the magnet covering member 190 is adjusted to a shape of the outer peripheral surface of a front base part of each claw pole 123 and 143 of the pole cores 12 and 14.

This configuration of the magnet covering member 190 reduces the gap between the outer peripheral surface of the front base part of each claw pole 123 and 143 and the inner peripheral surface of the magnet covering member 190, and thereby reduces the entering of the magnet powders into the inside of the magnet covering member 190. Furthermore, the configuration of the magnet covering member 190 inhibits that the magnet covering member 190 thrusts through the rotor 1 toward the opposite side in the axis direction. Still further, the configuration of the magnet covering member 190 of the second embodiment can prevent any adhesion of the magnet powders onto the surface of each of the claw poles 123 and 143 in the pole cores 12 and 14 in addition to the adhesion onto the exposed surface of the permanent magnets 15.

(Explanation of Assembling Processes for Rotor 1 and Alternator)

Next, a description will now be given of assembling and transfer processes for the rotor 1 with the magnet covering member 19 and 190 of the first and second embodiments with reference to FIG. 9.

FIG. 9 shows rotor and vehicle alternator assembling or manufacturing processes using the permanent magnets 15 that have been magnetized in advance.

In FIG. 9, the process "⑪ STORING AND SUPPLYING ASSEMBLED ROTOR 1" performed after the process C means that the assembled rotor 1 is stored into a storage location and is supplied as a replacement part, is not assembled into a vehicle alternator.

The magnet covering members 19 and 190 can be applied into the process A, the process B, and the process C as shown in FIG. 9. In particular, it is necessary to detach the magnet covering member 190 of the second embodiment from the rotor 1 in ⑤ cutting and grinding process in the process group A, and to attach it again after the completion of the cutting and grinding process. In FIG. 9, the permanent magnet assembling process designated by reference character ② uses permanent magnets 15 that have been magnetized.

(First Modification)

The first and second embodiments described above adopt a Lundell type rotor core as the rotor 1. The present invention is not limited by those embodiments. For example, the concept of the present invention regarding the magnet covering members 19 and 190 can be applied to a rotor having a configuration in which an outer peripheral surface of each of permanent magnets that are placed on a rotor core is exposed to the outside of the rotor core, such as a rotor mounted on a surface permanent magnet (SPM) synchronous machine.

(Second Modification)

A description will now be given of a modification of the first embodiment in which the magnet covering member 19 covers the outer peripheral surface of each permanent magnet 15.

In the second modification, one end part of each of the magnet covering members 19 in the axis direction at the outside of each permanent magnet 15 is connected to each other along the circumference direction of the pole cores 12 and 14. That is, the connected magnet covering members 19 of this configuration has a comb shape. This configuration can reduce the total number of the magnet covering members 19.

Because each of the pole cores 123 and 143 in the pole cores 12 and 14 has an approximate triangle shape (namely, a taper flat shape) when observed from the outside in the radial direction, the shape of the gap 101 between odd number claw poles is different in its projecting or protruding direction from the shape of the gap 101 between even number claw poles.

The gaps 101 between odd number claw poles are covered with the magnet covering member of a first comb cylindrical shape that has a front base part of a cylindrical shape at the pole core 12 side. On the other hand, the gaps 101 between even number claw poles are covered with the magnet covering member of a second comb cylindrical shape that has a front base part of a cylindrical shape at the pole core 14 side.

Because it is so formed that each gap 101 between the adjacent claw poles is slanted to the axis direction, when each of the first magnet covering member and the second magnet covering member is mounted on the rotor 1, each magnet covering member is screwed and pushed into the rotor 1. It is not necessary to detach both the first and second magnet covering members from the pole cores 12 and 14 when the outer peripheral surface of each claw pole in the pole cores 12 and 14 is grinded. Therefore the magnet covering member is capable of protecting the permanent magnets 15 in the rotor core 1 from adhesion of magnetic powders generated when grinding and cutting the claw poles. Further, because such a magnet covering member is detachable easily, the manufacturing efficiency can increase.

(Third Modification)

Figure 6B:
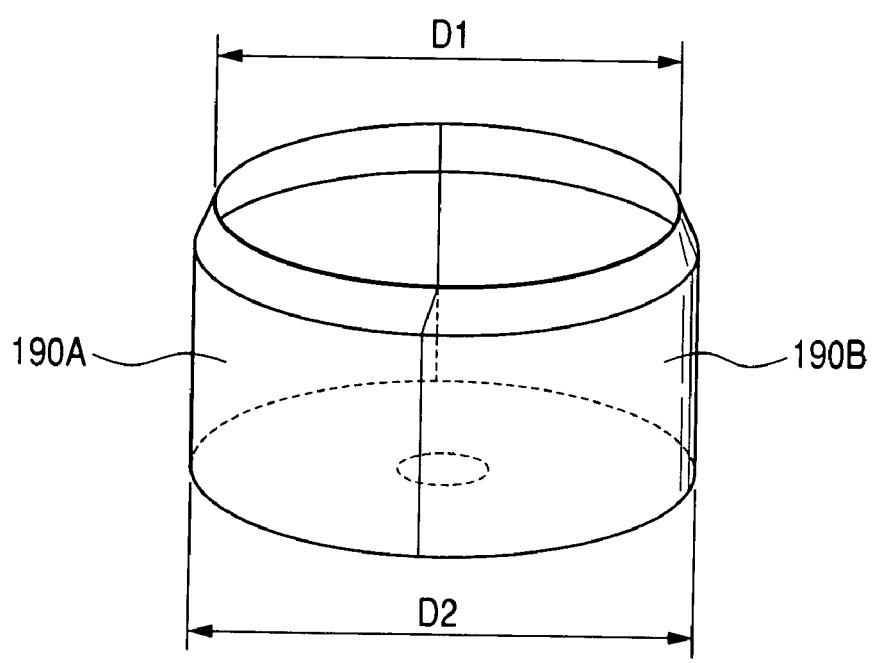
FIG. 6B is a perspective diagram showing the magnet covering member as another modification to be incorporated in the rotor shown in FIG. 5.

As a second modification, it is possible to modify the configuration of the magnet covering member 190 shown in FIG. 6A and FIG. 8 according to the second embodiment. In this modification, as shown in FIG. 6B, the magnet covering member 190 is divided into two parts 190A and 190B at the center portion in the axis direction thereof. This configuration of the modification of the magnet covering member allows that each part of the divided one has a bottom part with a circular hole through which the rotary shaft 11 shown in FIG. 1 is inserted, namely, each part is the cylindrical shape with the base part having the circular hole. It is thereby possible to promote the protection capability to the magnetic powders because the magnet covering member 190 having the two parts 190A and 190B can accommodate the rotary 1 completely.

In addition, it is possible to face front parts having a same diameter of the two divided parts 190A and 190B to each other, or also acceptable to form the front parts having different diameters of the two divided parts 190A and 190B of the magnet covering member 190 and the front parts of the two divided parts 190A and 190B are engaged to each other.

In addition, it is possible to be the magnet covering member diameter smaller than the stator inner diameter. In this case, the magnet covering member could be detachable even after incorporated into the stator.

(Fourth Modification)

In the various modifications set forth, the magnet covering members 19 and 190 made of a soft steel sheet is incorporated in the rotor 1. The present invention is not limited by those modifications. It is possible to have the same effect of the present invention when adopting following modifications:

(a) Using a tape with soft magnetic powder in which an adhesive tape is attached to its inside wall; and (b) Adhering a soft magnetic sheet on the outer peripheral surface of the permanent magnet 15.

(Fifth Modification)

The various embodiments and modifications have the effects described above when the permanent magnets 15, to be mounted on the rotor 1, have been magnetized in advance.

By the way, there is another type alternator, in the assembling process of which, permanent magnets of non-magnetized are mounted on the rotor 1, and the permanent magnets 15 are magnetized after the completion of the assembling process of the rotor 1. However, during the assembling process, magnetic powders and other dusts are adhered onto the rotor.

Accordingly, it is possible to apply the concept of the present invention to assembling process for a permanent magnet alternator without any exciting coil. That is, it is possible for such a permanent magnet alternator without any exciting coil to have the same effects by using the magnet covering members 19 and 190 according to the present invention.

FIG. 10 shows rotor and vehicle alternator assembling processes using the permanent magnets 15 of non-magnetized that have not been magnetized. The permanent magnets 15 are magnetized after the completion of the assembling process of the rotor 1 at process ⑩.

Similar to the first and second embodiment, in the fifth modification, the magnet covering member 19 and 190 muse be detached during the magnetization of the permanent magnets 15. Further, similar to the second embodiment, in the fifth modification, the magnet covering member 190 must be detached during cutting and grinding processes and then attached again after the completion of the cutting and grinding processes. Thus, the magnetic powder protection effect is maintained during the process B and process C, like the case shown in FIG. 9.

(Sixth Modification)

The adhesion tape set forth in the fourth modification is attached onto the surface of the permanent magnet 15, and detached from the permanent magnet 15 before the rotor 1 is assembled into the stator core 21. In this case, it is not necessary for the adhesion tape to have a soft magnetic characteristic when the claw poles 143 of the pole cores 12 and 14 do not need to have the magnetic short-circuit effect.

For example, before assembling to the pole cores 12 and 14, the adhesion tape is attached onto the outer exposed surface of the permanent magnet 15 in advance, and the adhesion tape is detached from the permanent magnet 15 before the assembled rotor 1 is incorporated into the stator core 21 in the alternator. This manner also has the same effect of protecting the surface of the permanent magnet 15 from the adhesion of magnetic powders and dust. By the way, the outer exposed surface of the permanent magnet 15 is the surface not to be contacted to adjacent the pole cores 12 and 14. Although the magnetic powders are attracted by the magnet field of the permanent magnet 15 and adhered onto the adhesion tape, before the assembled rotor 1 is incorporated into the stator core 21 in the alternator, the adhesion tape can be detached from the surface of the permanent magnet 15. It is preferred to use the adhesion tape in which adhesion material is applied on both the surfaces thereof. In this adhesion tape, because the magnetic powders are attracted by the magnetic field and then adhered and fixed onto the outer surface of the adhesion tape, it is possible to prevent re-adhesion of the magnetic powders when the adhesion tape is detached from the permanent magnet 15.

By the way, through the embodiment and the modifications set forth, the material of a soft magnetic characteristic is a material without any residual magnetic flux (the magnitude of a magnetic flux is zero) or with a weak residual magnetic flux under the external magnetic field of zero.

(Seventh Modification)

It is further acceptable to attach a resin film or to apply resin on the inner surface of the magnet covering members 19 and 190. That is, because this modification provides the inner surface of the magnet covering members 19 and 190 made of a soft material which is softer than the material forming the permanent magnet 15 and the material of the claw poles 12 and 14 of the pole core 12 and 14. This configuration thereby achieves the protection function of protecting the permanent magnet 15 and the claw poles 12 and 14 of the pole cores 12 and 14 as the surface of the rotor 1.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A magnet protection method of protecting magnet bodies to be mounted on a rotor in a rotary electric machine, comprising a step of:

before the rotor is assembled into a stator in the rotary electric machine, covering at least an outer exposed surface of each magnet body including a magnetized magnet at an outer peripheral side thereof with a magnet covering member made of soft magnet metal which is detachably supported by the rotor, wherein an outer surface of each magnet body is placed radially inward from an outer peripheral surface of a rotor core of the rotor in the rotary electric machine, before cutting and grinding the outer peripheral surface of the rotor core, the magnet covering member is attached onto at least the outer surface of each magnet body at an outside position of a radial direction from the outer surface of the magnet body and radially inward of the outer surface of the rotor core, and the magnet covering member is detached from the magnet body after completion of cutting and grinding the outer peripheral surface of the rotor core and before assembling the rotor into the stator of the rotary electric machine.

2. The magnet protection method according to claim 1, wherein the rotor core is a Lundell type rotor core having claw poles, and the magnet body is placed in a gap between adjacent claw poles in the rotor core and is positioned radially inward of the rotor rather than an outer peripheral surface of the claw pole, and each magnet covering member is made of a sheet of the soft magnet metal and placed radially inward from the outer peripheral surface of the claw pole of the Lundell type rotor core.

3. The magnet protection method according to claim 2, wherein a sectional shape of each magnet covering member is an approximate "U" shape, in which the magnet covering member is placed in the gap between the adjacent claw poles, and each magnet covering member comprises:

an outer surface part configured to cover the outer exposed surface of the magnet body; and a pair of side parts extended from both ends of an axis direction of the outer surface part of the magnet covering member toward the inside of the radial direction, covering the side surfaces of the magnet body.

4. The magnet protection method according to claim 3, wherein a front part of each side part of the magnet covering member has a sealing projection part that is bent toward the magnet body side and detachable in the radial direction from the magnet body.

5. The magnet protection method according to claim 2, wherein each magnet covering member is attached onto the magnet body at a predetermined distance determined by the gap, between the adjacent claw poles, against the outer exposed surface of the magnet body at the outer peripheral side.

6. The magnet protection method according to claim 1, wherein the rotor core is a Lundell type rotor core having claw poles, and the magnet body is placed in a gap between adjacent claw poles in the rotor core and is positioned radially inward of the rotor rather than an outer peripheral surface of the claw pole, and each magnet covering member has a cylindrical shape and is attached to the outer peripheral surface of the rotor core in which each magnet body is placed at a gap between adjacent claw poles of the Lundell type rotor core.

7. The magnet protection method according to claim 6, wherein each magnet covering member of a cylindrical shape is divided into two parts, and each part has a bottom part having a semicircular hole formed at a center of the bottom part through which a rotary shaft of the rotor is inserted.

8. The magnet protection method according to claim 2, wherein the outer surface part of each magnet covering member covering the outer exposed surface of the magnet body is coated with a resin film.

9. The magnet protection method according to claim 1, wherein each magnet covering member is made of an adhesion tape, one surface of which is coated with an adhesion material to be attached onto the exposed surface of the magnet body.

10. The magnet protection method according to claim 6, wherein a diameter of each magnet covering member is smaller than the stator inner diameter.

11. The magnet protection method according to claim 1, wherein each magnet body is magnetized in advance.

12. A magnet protection method of protecting magnet bodies to be mounted on a rotor in a rotary electric machine, comprising a step of:

before the rotor is assembled into a stator in the rotary electric machine, covering at least an outer exposed surface of each magnet body including a magnetized magnet at an outer peripheral side thereof with a magnet covering member made of soft magnet metal which is detachably supported by the rotor, wherein each magnet body is magnetized after completion of cutting and grinding the outer peripheral surface of a rotor core and the magnet covering member is detached from the magnet body.

13. The magnet protection method according to claim 12, wherein the rotor core is a Lundell type rotor core having claw poles, and the magnet body is placed in a gap between adjacent claw poles in the rotor core and is positioned radially inward of the rotor rather than an outer peripheral surface of the claw pole, and each magnet covering member is made of a sheet of the soft magnet metal and placed radially inward from the outer peripheral surface of the claw pole of the Lundell type rotor core.

14. The magnet protection method according to claim 13, wherein a sectional shape of each magnet covering member is an approximate "U" shape, in which the magnet covering member is placed in the gap between the adjacent claw poles, and each magnet covering member comprises:

an outer surface part configured to cover the outer exposed surface of the magnet body; and a pair of side parts extended from both ends of an axis direction of the outer surface part of the magnet covering member toward the inside of the radial direction, covering the side surfaces of the magnet body.

15. The magnet protection method according to claim 14, wherein a front part of each side part of the magnet covering member has a sealing projection part that is bent toward the magnet body side and detachable in the radial direction from the magnet body.

16. The magnet protection method according to claim 13, wherein each magnet covering member is attached onto the magnet body at a predetermined distance determined by the gap, between the adjacent claw poles, against the outer exposed surface of the magnet body at the outer peripheral side.

17. The magnet protection method according to claim 13, wherein the outer surface part of each magnet covering member covering the outer exposed surface of the magnet body is coated with a resin film.

18. The magnet protection method according to claim 12, wherein each magnet covering member is made of an adhesion tape, one surface of which is coated with an adhesion material to be attached onto the exposed surface of the magnet body.

* * * * *